W. KEANE.
Swaging Screws.
RX No. 2.
Reissued April 16, 1838.
9398X RELATED DOC.
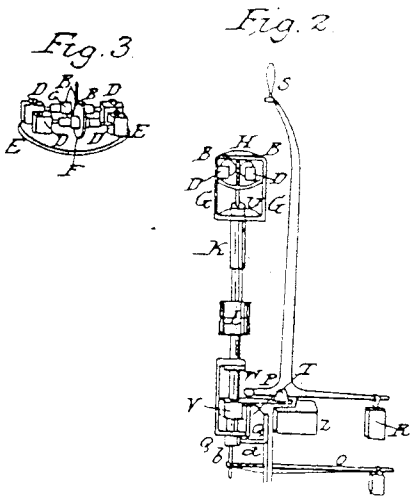
Fig. 2
Fig. 3
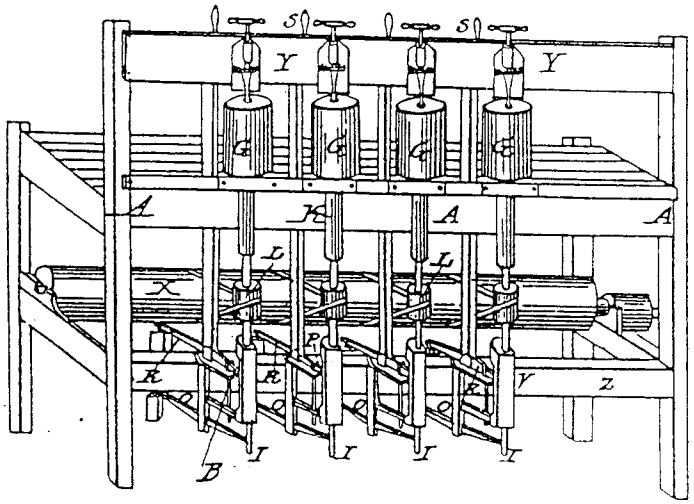
Fig. 1.

RX2

UNITED STATES PATENT OFFICE.

THADDEUS SELLICK, OF HAVERSTRAW, ADMINISTRATOR OF WM. KEANE, OF MONROE, NEW YORK.

IMPROVEMENT IN MACHINES FOR CUTTING WOOD AND OTHER SCREWS.

Related Doc 9398X

Specification forming part of Letters Patent dated February 13, 1836; Reissue No. 2, dated April 16, 1838.

*To all whom it may concern:*

Be it known that WILLIAM KEANE, of the town of Monroe, in the county of Orange and the State of New York, was the inventor of a new and useful Improvement in the Machine for Making Screws, principally of the kind denominated "Wood-Screws;" and I do hereby declare that the following is a full and exact description thereof.

In the accompanying drawings, A A, Figure 1, represent the frame of the machine which is to support the revolving spindles and other parts of the apparatus. The threads are to be cut by means of two circular dies which revolve upon suitable axes with their peripheries nearly in contact with each other. A semicircular or other suitably-formed groove is made in the periphery of each die, and upon these the thread of the screw is cut, by which a corresponding thread is to be formed upon the blank which is to be made into a wood-screw. A tool very similar in form to this part of my instrument is used by jewelers and other small workers in metal for the purpose of milling or forming thread-like ornaments spirally upon gold wire and other articles. In Fig. 2 two such dies are represented as stationed upon the under side of a circular plate of iron which forms the cover of a revolving box, B, Figs. 1 and 3, to be presently described.

*a a* are the revolving dies, which will vary in size according to the size of the screw which they are to cut; but for a screw of a medium size they may be about an inch and three-fourths in diameter and half an inch thick. Dies of this size may have their shafts *b b* half an inch in diameter and two and a half inches long, revolving on centers adjusted by screws. The shafts are placed parallel to each other, as shown in the drawings. A greater number of such dies may be used—as three, for example—in wh ch their axes will not be parallel to each other. The iron plate C is shown in place in Fig. 1, forming the cover of the box B, which revolves with the shaft D, upon which it is firmly fixed, E E being whirls for the driving-bands from any suitable power.

B is a box of cast-iron, which may be seven inches high and six inches in diameter. The main use of this is to contain a mixture of oil and water, soapsuds, or other suitable lubricating fluid which will keep the dies and the blank constantly lubricated during the operation of cutting, and thus effectually prevent the heating and wearing of the parts, while it insures the smooth cutting of the screw. The shaft D may be two feet long and one inch and a half in diameter. It is bored through its whole length, so as to receive a sliding rod, F F, about three-fourths of an inch in diameter, around which it is to revolve freely.

G G are steps attached to the frame A', upon which the shaft D revolves, being perforated also to allow the sliding rod to pass through it. This sliding rod is attached to an independent sliding frame, the upper and lower bars of which, *c* and *d*, are connected by the vertical rods *e e*. The sliding rod F does not revolve with the spindle D, through which it passes; but it has an independent sliding motion through said shaft, and also through the lower bar, *d*, of the sliding frame. It has a hub, *f*, fastened upon it by means of a tightening-screw, from which proceed the guide-arms *g g*, which slide upon the rods *e e* and prevent the rod F from turning.

H is a spring which bears upon the bar *d* and upon the hub *f*, allowing the rod to be forced down, but reacting against the hub, so as to tend to raise it until it comes into contact with the step G.

On the upper end of the slide-rod F there is a steel screw, *h*, the thread of which fits that of the circular dies *a a*, and it will be seen, therefore, that if this steel screw is raised, so as to stand between the dies, the revolution of the box B, in which they are contained, will, by the aid of the screw, cause them to revolve on their axes, and that a like effect would be produced by raising or lowering the sliding rod while the box B is at rest. The cap or cover C of the box B has a perforation through its center, which is immediately over the grooves in the dies, and through which the blanks to be cut are fed to them. The blanks which have been prepared by being headed and notched are passed into this opening, so that the point of the intended screw will rest upon the upper end of the steel screw *h*, while a steel rod or screw-holder, *i*, finished at its lower end like a screw-driver, is brought down upon said head, its edge falling into the notch. This may be effected in various ways; but that which is deemed one of the most convenient is the following, as shown in the drawings, the detached parts having the same letters on them to designate the same parts as those used in the principal figures. The rod *i* is the screw-holder which passes through the bar *c*, and is affixed in its place by a tightening-screw, by which it is adapted to screws of various lengths. A leather strap, *j*, one end of which is made fast to the bar *c* of the sliding frame, has its opposite end attached to and passing round the circular hub *k*, which is made to turn by means of the handle *l*. When these handles are forced down, the sliding frame, and consequently the screw-holder, will be raised, while the spring H tends to bring it back to its former position when allowed to do so. The iron fixtures *m m*, attached to the frame $A^2$ $A^2$, sustain the hub *k* and its appendages. If square-headed screws are to be cut or other forms be required, the holding apparatus must be adapted thereto.

Instead of the spring H H, weighted levers have sometimes been used, and they have been variously modified, so as to produce the same effect, and they answer the purpose perfectly well; but being more complicated than the plan above described, they are not preferred; nor does the claim to invention rest in any degree upon one or the other of these modes of procedure, they being deemed equivalents.

What is claimed as new in the above-described machine, and as the invention of the within-named WILLIAM KEANE, is—

1. The manner of cutting the threads upon the screws by means of machinery constructed and combined together substantially in the manner herein set forth—that is to say, having two or more revolving circular dies with the required thread cut upon their peripheries, and so placed that they may revolve vertically on their axes, and be carried round horizontally with and by means of a revolving box, in which is contained a suitable lubricating-fluid, as described.

2. The general construction and arrangement of the respective parts of the said machine, by means of which the blank is held while being cut, and liberated when cut, and again fed with a new blank, together with such variations of said construction and arrangement as shall not essentially alter its character or mode of operation.

THADDEUS SELLICK.

Witnesses:
JAMES MILLER,
RICHARD GURNEE.